US010222685B2

(12) United States Patent
Kikuma et al.

(10) Patent No.: US 10,222,685 B2
(45) Date of Patent: Mar. 5, 2019

(54) PROJECTION IMAGE DISPLAY DEVICE

(71) Applicant: JVC KENWOOD Corporation, Yokohama-shi, Kanagawa (JP)

(72) Inventors: Shinji Kikuma, Yokohama (JP); Takatsugu Aizaki, Yokohama (JP); Yasuki Arihara, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 39 days.

(21) Appl. No.: 15/672,738

(22) Filed: Aug. 9, 2017

(65) Prior Publication Data

US 2018/0067389 A1   Mar. 8, 2018

(30) Foreign Application Priority Data

Sep. 7, 2016 (JP) ................................. 2016-174619

(51) Int. Cl.
| | |
|---|---|
| *G03B 21/20* | (2006.01) |
| *F21K 9/60* | (2016.01) |
| *F21V 7/00* | (2006.01) |
| *G02B 27/14* | (2006.01) |
| *G02B 26/00* | (2006.01) |

(52) U.S. Cl.
CPC ............ *G03B 21/2033* (2013.01); *F21K 9/60* (2016.08); *F21V 7/0066* (2013.01); *G02B 27/141* (2013.01); *G02B 26/007* (2013.01)

(58) Field of Classification Search
CPC ..... G03B 21/2033; F21K 9/60; F21V 7/0066; G02B 26/007

USPC .......................................................... 353/31
See application file for complete search history.

(56) References Cited

U.S. PATENT DOCUMENTS

| | | | |
|---|---|---|---|
| 6,260,972 B1* | 7/2001 | Robinson ........... | G02B 27/0905 348/E9.027 |
| 2012/0154767 A1* | 6/2012 | Kimura .................. | H04N 9/315 353/98 |
| 2014/0098349 A1* | 4/2014 | Nagasawa .......... | G03B 21/2033 353/31 |

FOREIGN PATENT DOCUMENTS

JP       2006-227469 A       8/2006

* cited by examiner

*Primary Examiner* — Steven H Whitesell Gordon
*Assistant Examiner* — Jerry Brooks
(74) *Attorney, Agent, or Firm* — Brundidge & Stanger, P.C.

(57) ABSTRACT

A projection image display device includes: a light source that emits a blue illumination light; a phosphor that produces, in a region irradiated by the blue illumination light, a yellow illumination light including a component in a red band and a component in a green band from a portion of the blue illumination light and that reflects the blue illumination light and the yellow illumination light; and a filter that reflects a portion of the blue illumination light reflected by the phosphor toward the phosphor. The filter reflects the portion of the blue illumination light so as to be imaged at a position displaced from a region on a phosphor surface irradiated by the blue illumination light, and the phosphor produces a yellow illumination light also from the blue illumination light reflected by the filter.

6 Claims, 11 Drawing Sheets

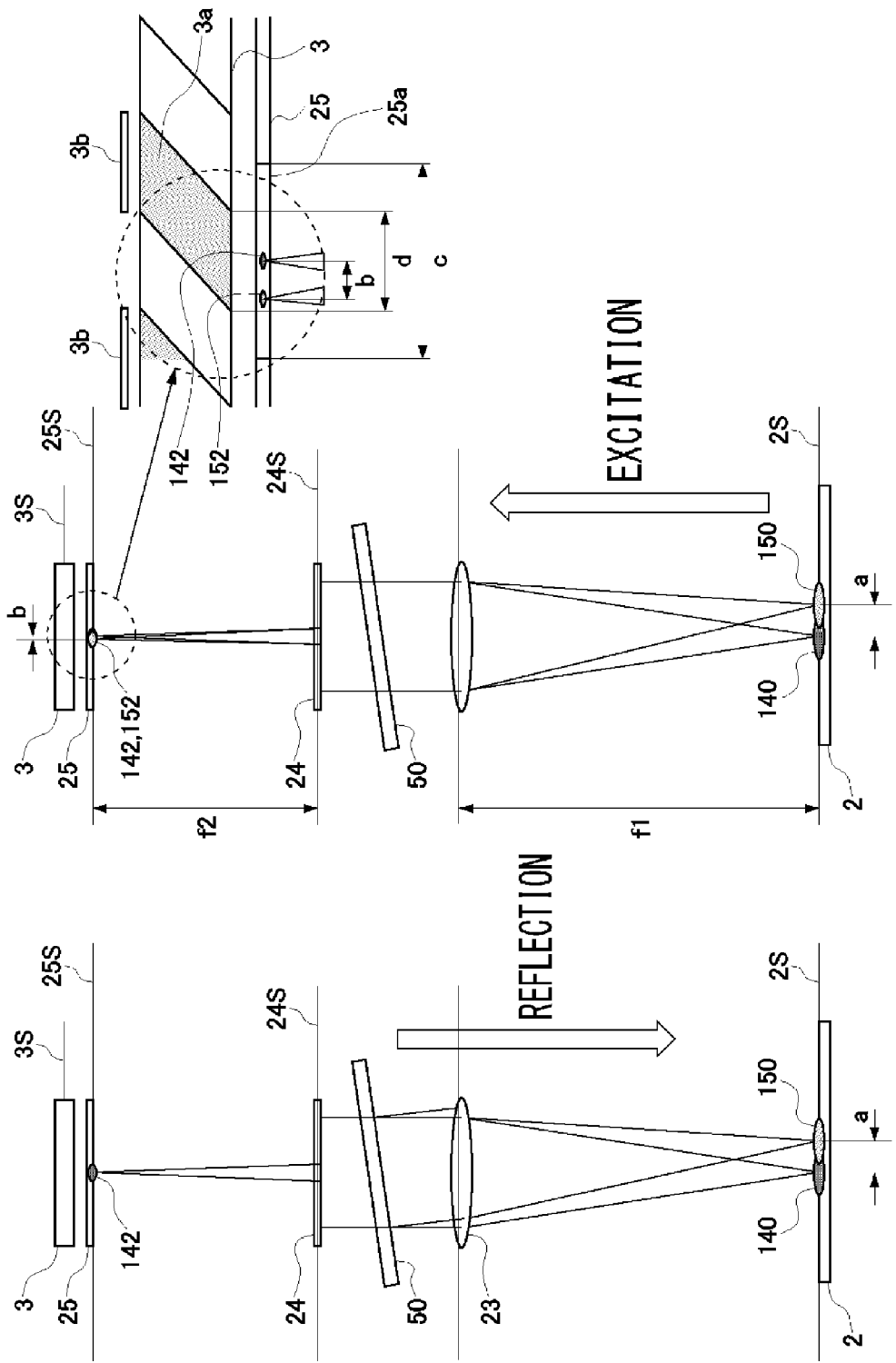

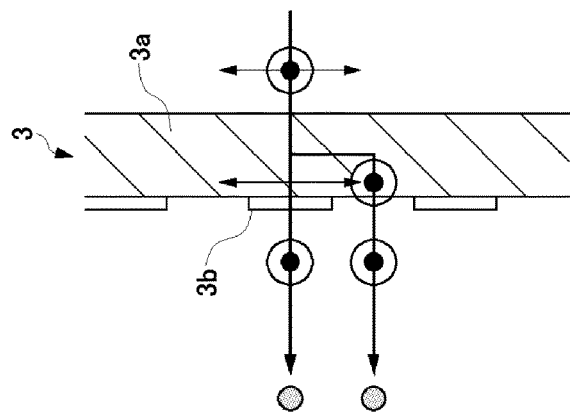
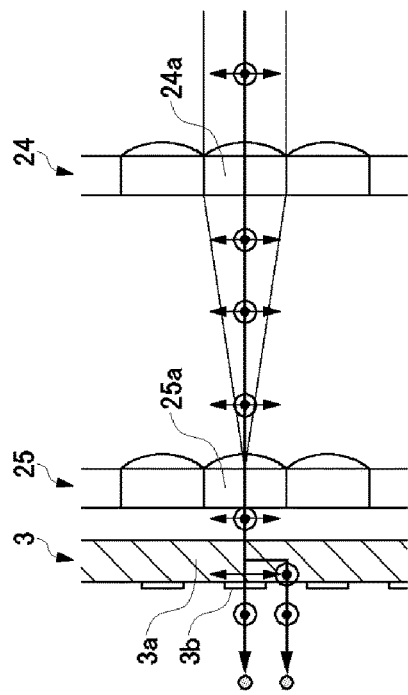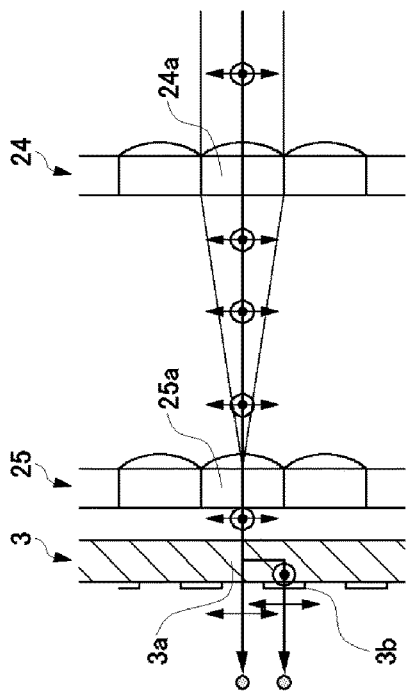

FIG. 11

| FILTER | | | GAIN OF BLUE IMAGE SIGNAL | OUTPUT IMAGE | |
|---|---|---|---|---|---|
| YES/NO | ANGLE OF TILT | TRANSMITTANCE IN BLUE BAND | | COLOR TEMPERATURE | BRIGHTNESS |
| NO | – | – | 100% | 7500K | 100% |
| | – | | 70% | 6500K | 95% |
| YES | 0° | 80% | 100% | 6500K | 100% |
| | 1° | 90% | 100% | 6500K | 105% |

PROJECTION IMAGE DISPLAY DEVICE

BACKGROUND OF THE INVENTION

1. Field of the Invention

The present invention relates to a projection image display device.

2. Description of the Related Art

In a projection image display device, a blue laser light source or a yellow phosphor is used as an illumination source, for example. A blue light image is produced by using a blue laser light source as an illumination source. A red light image and a green light image are produced by using a yellow phosphor as an illumination source. More specifically, the yellow phosphor is irradiated by a laser light from the blue laser light source and converts the energy of the irradiating laser light into a yellow light of a wavelength band including a red band and a green band.

Patent document 1 discloses a projector in which switching between a mode of high color temperature such as 7500 K and a mode of low temperature is implemented by a dark filter, the high color temperature mode being used when brightness is a major concern and the low color temperature mode being used when color reproduction is a major concern.

Patent Document 1: JP2006-227469

In a case where a dark filter is used to lower the color temperature as in the projector of patent document 1, there is a problem in that the brightness of a projected image is lowered in association with a changed the color temperature.

SUMMARY OF THE INVENTION

The present invention addresses the issue and a purpose thereof is to provide a technology adapted for a projection image display device capable of switching between a mode of high color temperature and a mode of low color temperature, whereby it is possible to lower the color temperature while at the same time inhibiting the brightness of a projected image from being lowered.

To address the aforementioned issue, a projection image display device according to an embodiment comprises: a light source (1) that emits a blue illumination light; a phosphor (2) that produces, in a region irradiated by the blue illumination light, a yellow illumination light including a component in a red band and a component in a green band from a portion of the blue illumination light and that reflects the blue illumination light and the yellow illumination light; and a filter (50) that reflects a portion of the blue illumination light reflected by the phosphor toward the phosphor. The filter reflects the portion of the blue illumination light so as to be imaged at a position displaced from a region on a phosphor surface irradiated by the blue illumination light, and the phosphor produces a yellow illumination light also from the blue illumination light reflected by the filter.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 9A and 9B show relative positions of the spot image produced on the phosphor surface by the blue reflected light from the tilted filter of the projection image display device according to the embodiment and the spot conjugate image on the second fly-eye lens surface;

FIG. 10A shows the structure of the polarization conversion system of the projection image display device according to the embodiment, and FIGS. 10B and 10C show light incident from cells of the first fly-eye lens and the second fly-eye lens of the projection image display device according to the embodiment on the polarization conversion system;

FIG. 11 shows a comparison between the reflectivity of the filter of the projection image display device according to the embodiment and the brightness of images;

DETAILED DESCRIPTION OF THE INVENTION

The invention will now be described by reference to the preferred embodiments.

This does not intend to limit the scope of the present invention, but to exemplify the invention.

Figure 1:
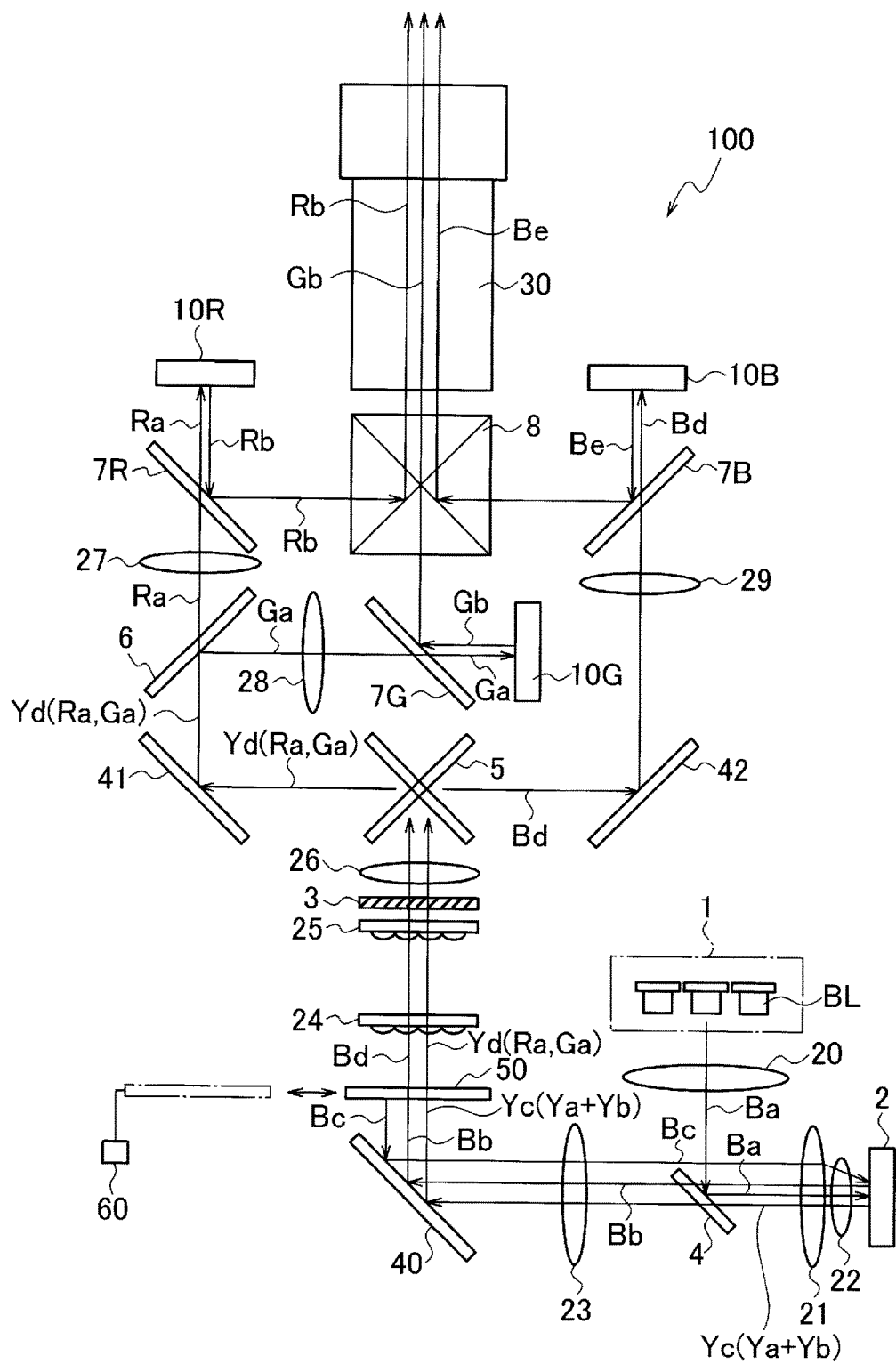
FIG. 1 shows the configuration of the projection image display device according to the embodiment.

A description will be given of a projection image display device according to an embodiment with reference to FIG. 1. FIG. 1 shows the overall configuration of the projection image display device according to the embodiment.

A projection image display device 100 includes a light source 1, a phosphor 2, a polarization conversion system (PCS) 3, dichroic mirrors 4-6, reflective polarization plates 7R, 7G, 7B, a color composition prism 8, image display devices 10R, 10G, 10B, lenses 20-30, reflecting mirrors 40-42, a filter 50, and a motor 60.

For example, the light source 1 is comprised of a laser array in which a plurality of blue laser devices BL are arranged. The light source 1 emits a blue laser light. The blue laser light will be referred to as a blue illumination light in the following description.

Condensing lenses 20, 21, 22 condense the incident blue illumination light.

The dichroic mirror 4 has the function of reflecting the blue illumination light and transmitting a yellow illumination light.

The phosphor 2 has a phosphor layer producing a yellow illumination light including a component in a red band and a component in a green band having an intensity commensurate with the energy of the light emitted from the light source 1, and, more specifically, the energy intensity of a portion of the blue illumination light emitted from the light source 1. The phosphor 2 also has a reflecting surface reflecting the yellow illumination light and the blue illumination light transmitted through the phosphor layer.

The light source 1 (blue laser device BL) and the phosphor 2 constitute an illumination light source. The collimator lens 23 turns the incident light into parallel light.

The filter 50 is arranged on a light path between the reflecting mirror 40 and a first fly-eye lens 24 in such a manner that the filter can be inserted into or retracted from the light path as desired. The filter 50 has the function of a predetermined wavelength band reflecting filter configured to reflect a portion of the blue illumination light, returning it to the phosphor 2, and to transmit the rest of the light.

It is desired that the filter 50 be arranged at an arbitrary position on the light path of the parallel light between the collimator lens 23 and the first fly-eye lens 24.

Figure 2:
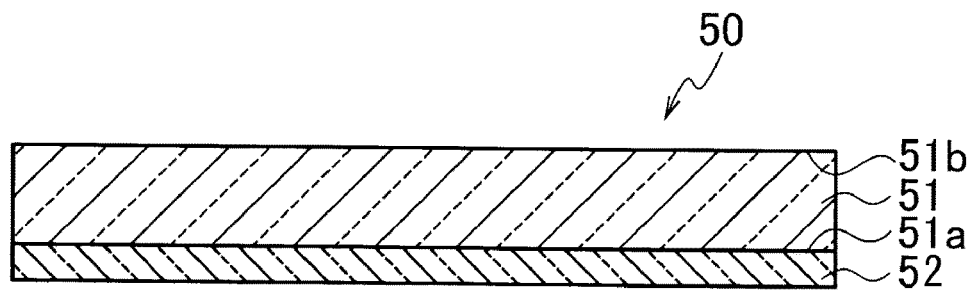
FIG. 2 is a cross sectional view schematically showing the filter of the projection image display device according to the embodiment.

A description will be given of the filter 50 with reference to FIG. 2. FIG. 2 is a cross sectional view schematically showing the filter 50.

As shown in FIG. 2, the filter 50 includes a transparent substrate 51 such as a glass substrate, and a dielectric multi-layer film 52 formed on a surface 51a (e.g., surface of incidence) of the transparent substrate 51.

The dielectric multi-layer film 52 reflects a portion of the blue illumination light and transmits the rest of the light. In essence, the dielectric multi-layer film 52 has the function of a predetermined wavelength band reflecting filter. The dielectric multi-layer film 52 is a multi-layer film in which a high refractive index dielectric film and a low refractive index dielectric film are alternately stacked. The reflectivity of the blue illumination light can be set to a desired value by configuring the dielectric film material, the film thickness, the number of layers, etc. of the dielectric multi-layer film 52.

The dielectric multi-layer film 52 may be formed on a surface of emission 51b of the transparent substrate 51.

Referring back to FIG. 1, the motor 60 has the function of a driver that inserts the filter 50 into the light path or retract the filter 50 from the light path. The motor 60 exemplifies the driver.

Each of the first fly-eye lens 24 and a second fly-eye lens 25 is formed of a plurality of lens cells and homogenizes the illumination distribution of the red illumination light, green illumination light, and blue illumination light irradiating the image display devices 10R, 10G and 10B. The shape of a cell forming each of the first fly-eye lens and the second fly-eye lens is rectangular and the length of the longer side of the cell is larger than the slit width of the PCS 3. The PCS 3 turns the incident illumination light into a p-polarized light. A cross dichroic mirror 5 separates the yellow illumination light (including red illumination light and green illumination light) and the blue illumination light that are incident.

A dichroic mirror 6 splits the incident light by reflection and transmittance, with a wavelength of separation being defined as the border of separation. More specifically, the dichroic mirror 6 reflects the green illumination light in response to the incident yellow illumination light and transmits the red illumination light, thereby separating the yellow illumination light into the green illumination light and the red illumination light. The reflectivity for the green illumination light and the transmittance for the red illumination light are such that the reflectivity is 100% on the short wavelength side and the transmittance is 100% on the long wavelength side, the wavelength of separation being the border between the short wavelength side the long wavelength side.

The reflectivity for the green illumination light and the transmittance for the red illumination light are smaller at a wavelength near the wavelength of separation. It can therefore be said that the border of separation has a width around the wavelength of separation. Due to the width of the border of separation, the red illumination light includes components of the green wavelength band and the green illumination light includes components of the red wavelength band. It is ideal from the perspective of the efficiency of use of optical energy that the border of separation has zero width.

The reflective polarization plates 7R, 7G, and 7B have the function of reflecting s-polarized light and transmitting p-polarized light. For example, the reflective polarization plates 7R, 7G, and 7B may be formed by a wire grid.

The image display device 10R is a red image light modulation device for subjecting the irradiating red illumination light to light modulation based on red image data components and producing a red image light.

The image display device 10G is a green image light modulation device for subjecting the irradiating green illumination light to light modulation based on green image data components and producing a green image light.

The image display device 10B is a blue image light modulation device for subjecting the irradiating blue illumination light to light modulation based on blue image data components and producing a blue image light.

The color composition prism 8 has the function of reflecting the blue image light and the red image light and transmitting the green image light so as to produce a composite of the red image light, the green image light, and the blue image light.

The projection lens 30 projects the red image light, the green image light, and the blue image light onto a screen etc. so as to display a full color image.

In this embodiment, it is necessary for the spot diameter of the blue laser light to be small enough to be accommodated in a region ("first corresponding region" described later) corresponding to one cell of the second fly-eye lens 25 on the phosphor surface or a region ("second corresponding region" described later) corresponding to the slit width of the PCS 3. The diameter of the spot incident on the phosphor 2 affects the wavelength conversion efficiency of the phosphor 2. If the blue laser light is incident locally on the phosphor 2 (i.e., if the spot diameter of the blue laser light is small), the efficiency of conversion in the phosphor 2 will be poor. This is because the efficiency of conversion saturate if the energy incident on the phosphor 2 grows large.

The first fly-eye lens 24 and the second fly-eye lens 25 exemplify an integrator optical system. A description will be given of how the cells of the second fly-eye lens 25 and the phosphor surface are optically conjugate with each other.

The first fly-eye lens 24 and the second fly-eye lens 25 are arranged such that the number of cells of the first fly-eye lens 24 and that of the second fly-eye lens 25 are identical and the light axes of the opposite cells are aligned. The parallel light incident on each cell of the first fly-eye lens 24 is condensed by the opposite cell of the second fly-eye lens 25 and is incident on the PCS 3.

Incidence of the blue light on the phosphor 2 produces a reflected blue light and a yellow excitation light. For this reason, an irradiation spot of the blue light on the phosphor surface can be seen as a pseudo white light source. In order to condense diffused light emitted from the pseudo white light source efficiently, the condensing lenses 21 and 22 are arranged such that the center of the light axes thereof is aligned with the spot on the phosphor surface irradiated by the blue laser. An image on the phosphor is formed on the cells of the second fly-eye lens 25, with the first fly-eye lens 24 being an optical pupil. This places the phosphor surface and the surfaces of the cells of the second fly-eye lens 25 so as to be conjugate with one another.

A description will be given of a group of collimator lenses 23 that condense the yellow illumination light excited from the phosphor in a predetermined angular range of condensing. The yellow illumination excited on the phosphor surface is diffused over an extensive angular range. The group of collimator lenses 23 is arranged in the neighborhood of the phosphor surface in order to condense the yellow illumination light efficiently. The blue laser light from the LD light source 1 is reflected by the dichroic mirror 4 and is incident on the phosphor surface.

A description will now be given of a state in which the filter 50 is arranged on the light path and a state in which the filter 50 is retracted from the light path with reference to FIGS. 1-6.

The state in which the filter 50 is arranged on the light path is referred to as a color temperature changing mode. The color temperature changing mode is a mode in which the color temperature of a displayed image is lowered. The state in which the filter 50 is retracted from the light path is referred to as a brightness priority mode. The brightness priority mode is a mode in which the brightness of a displayed image is prioritized.

Color Temperature Modification Mode

A description will be given of the color temperature changing mode with reference to FIGS. 1, 3, 4, and 5. The color temperature changing mode requires a state in which the filter 50 is arranged on the light path.

As shown in FIG. 1, the blue illumination light Ba emitted from the light source 1 is condensed by the condensing lens 20 and reflected by the dichroic mirror 4. The blue illumination light Ba is further condensed by the condensing lenses 21 and 22 and is incident on the phosphor 2.

The phosphor 2 converts the energy of the irradiating blue illumination light Ba and produces a yellow illumination light Ya including a red band and a green band.

The yellow illumination light Ya produced by the phosphor 2 is transmitted by the condensing lenses 22, 21 and the dichroic mirror 4 and is incident on the collimator lens 23. A portion of the blue illumination light Ba irradiating the phosphor 2 is not converted into the yellow illumination light Ya and is reflected by the phosphor 2 and is incident on the collimator lens 23 as a blue illumination light Bb.

The yellow illumination light Ya and the blue illumination light Bb incident on the collimator lens 23 and turned into parallel light and are reflected by the reflecting mirror 40 toward the filter 50. Bb indicates the total amount of blue illumination light incident on the filter 50.

Figure 3:
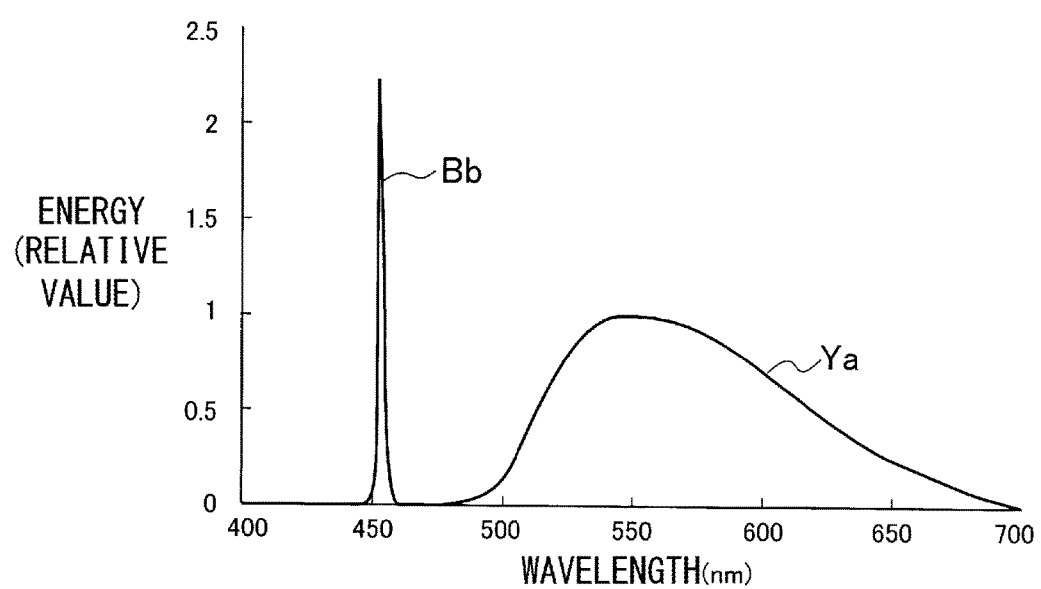
FIG. 3 is a graph showing the spectral distribution of the yellow illumination light and the blue illumination light irradiating the filter.

FIG. 3 is a graph showing the spectral distribution of the yellow illumination light Ya and the blue illumination light Bb irradiating the filter 50. The vertical axis represents energy (relative value calculated by defining the peak value of yellow illumination light Ya to be 1). The horizontal axis represents wavelength (nm). Defining the peak value of the yellow illumination light Ya to be 1, the peak value of the blue illumination light Bb is about 2.2.

Since the blue illumination light Bb is a laser light, the wavelength band is narrow. Meanwhile, the yellow illumination light Ya is produced by converting the blue illumination light Bb in the phosphor 2 and so has a wide wavelength band including a red band and a green band with an energy intensity commensurate with the energy intensity of the blue illumination light Bb. The energy intensity of the blue illumination light Bb may be determined in consideration of the efficiency of conversion by the phosphor 2 and the intensity of light incident on the light modulation devices of the respective colors.

Figure 4:
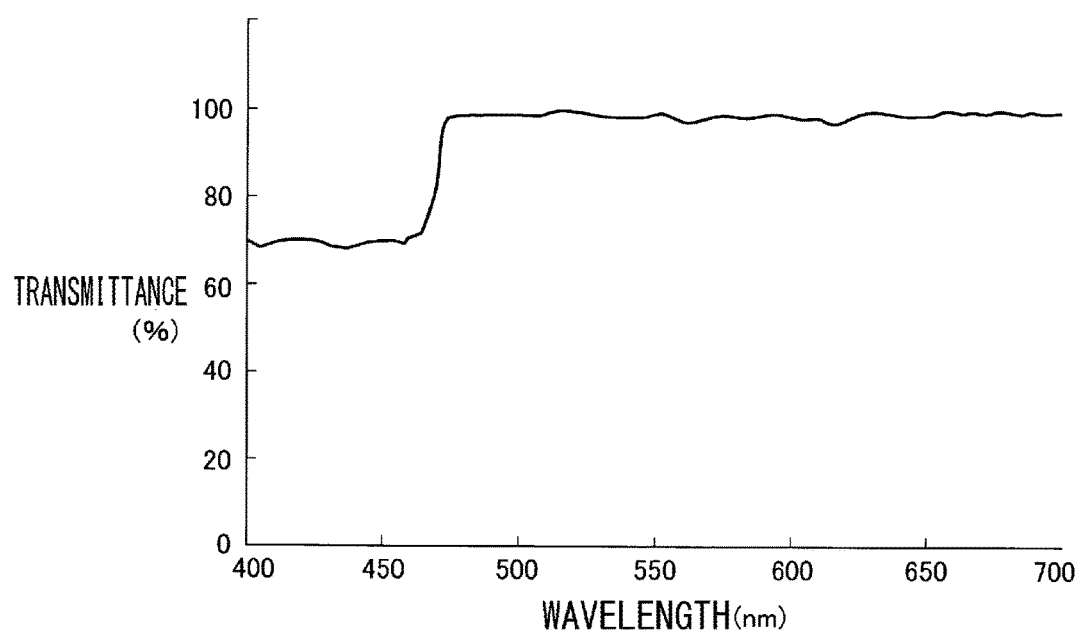
FIG. 4 is a graph showing the spectral transmission characteristics of the filter of the projection image display device according to the embodiment.

FIG. 4 is a graph showing the spectral transmission characteristics of the filter 50. The vertical axis represents transmittance (%). The horizontal axis represents wavelength (nm).

For example, the filter 50 reflects about 30% of the blue illumination light Bb and transmits about 70% thereof. The light not transmitted by the filter 50 is reflected. The reflectivity of the filter 50 for the blue illumination light is adjusted in accordance with a desired color temperature.

A portion of the blue illumination light Bb is reflected by the filter 50 as a blue illumination light Bc. The rest of the blue illumination light Bb is transmitted by the filter 50 and emitted as a blue illumination light Bd. The blue illumination light Bc indicates the total amount of blue illumination light reflected by the filter 50 and the blue illumination light Bd indicates the total amount of blue illumination light emitted from the filter 50. The reflected blue illumination light Bc is further reflected by the reflecting mirror 40 and irradiates the phosphor via the collimator lens 23 and the condensing lenses 21, 22. The phosphor 2 converts the energy of the irradiating blue illumination light Bc and produces a yellow illumination light Yb in a fluorescence band including a red band and a green band. A portion of the blue illumination light Bc irradiating the phosphor 2 is not converted into the yellow illumination light Yb and is reflected by the phosphor 2 and is incident on the collimator lens 23, superimposed on the blue illumination light Bb.

Therefore, a yellow illumination light Yc including the yellow illumination light Ya produced by the blue illumination light Ba emitted from the light source 1 and the yellow illumination light Yb produced by the blue illumination light Bc returning from the filter 50 are incident on the filter 50.

In order to prevent the blue illumination light Bc irradiating the phosphor 2 from being reduced due to the reflection of the blue illumination light Bc on the surface of the dichroic mirror 4, the irradiation area on the dichroic mirror 4 may be reduced. In this case, the conversion efficiency of the yellow illumination light Yc is increased by determining the illumination area in consideration of a balance between the efficiency of the blue illumination light Ba being incident on the phosphor 2 and the efficiency of the blue illumination light Bc being incident on the phosphor 2.

Figure 5:
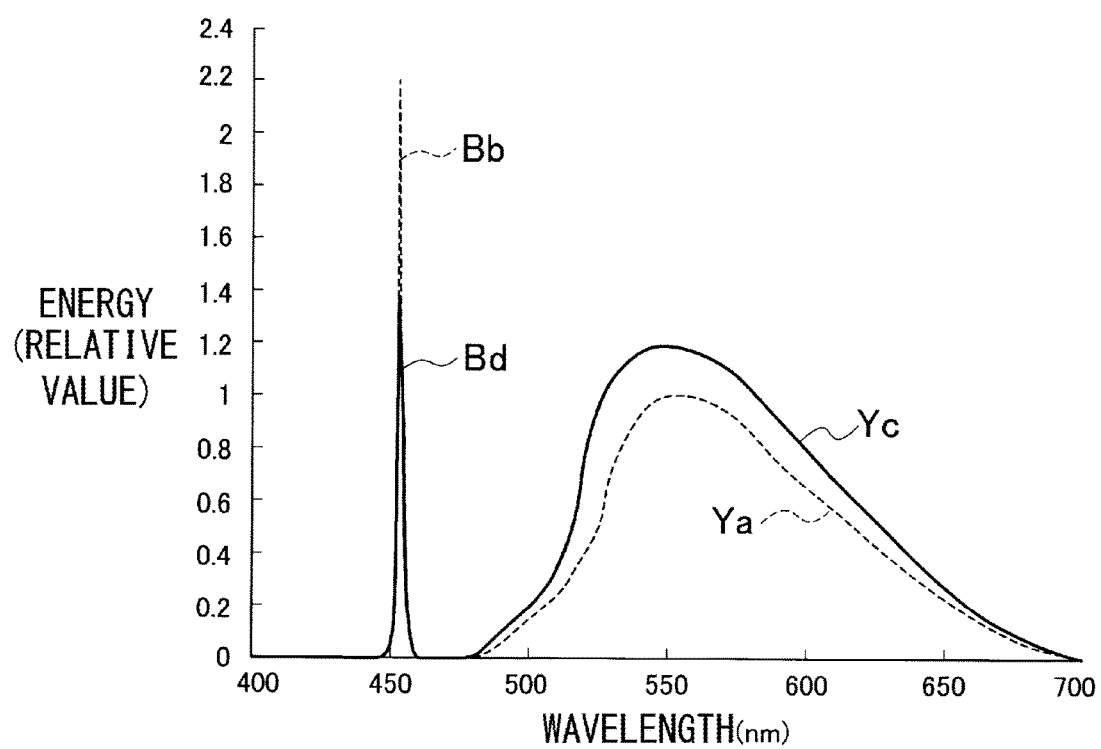
FIG. 5 is a graph showing the spectral distribution of the yellow illumination light and the blue illumination light incident on the filter of the projection image display device according to the embodiment.

FIG. 5 is a graph showing the spectral distribution of the yellow illumination light Yc and the blue illumination light Bd. The vertical axis represents energy (relative value calculated by defining the peak value of the yellow illumination light Ya to be 1). The horizontal axis represents wavelength (nm). In the color temperature changing mode of the first embodiment, the peak value of the yellow illumination light Yc is increased from 1 to about 1.2 and the peak value of the blue illumination light Bd is reduced from about 2.2 to about 1.4.

Since a portion of the blue illumination light Bb incident on the filter 50 is reflected as the blue illumination light Bc, the energy of the blue illumination light Bd emitted from the filter 50 is smaller than that of the blue illumination light Bb (see FIG. 3). Meanwhile, since the yellow illumination light Yc incident on the filter 50 includes the yellow illumination light Ya and the yellow illumination light Yb, the energy of the yellow illumination light Yc is larger than that of the yellow illumination light Ya (see FIG. 3). In essence, the brightness of the yellow illumination light is higher than when the filter 50 is not inserted.

The yellow illumination light Yc is emitted from the filter 50 as a yellow illumination light Yd including a red illumination light Ra, a component in a red band, and a green illumination light Ga, a component in a green band.

The illumination distribution of the yellow illumination light Yd and the blue illumination light Bd emitted from the filter 50 is homogenized by the first fly-eye lens 24 and the second fly-eye lens 25. The yellow illumination light Yd and the blue illumination light Bd are turned into p-polarized light by the PCS 3 and are incident on the cross dichroic mirror 5 via the lens 26.

The yellow illumination light Yd and the blue illumination light Bd are subject to color separation by the cross dichroic mirror 5. The yellow illumination light Yd is reflected by a reflecting mirror 41 and is incident on the dichroic mirror 6. The red illumination light Ra and the green illumination light Ga included in the yellow illumination light Yd are subject to color separation by the dichroic mirror 6.

The red illumination light Ra is transmitted by the dichroic mirror 6 and is incident on the reflective polarization plate 7R via the lens 27. The red illumination light Ra is transmitted by the reflective polarization plate 7R and is incident on the image display device 10R.

The red illumination light Ra is subject to light modulation by the image display device 10R and is emitted as an s-polarized red image light Rb. The red image light Rb is reflected by the reflective polarization plate 7R and is incident on the color composition prism 8.

The green illumination light Ga is reflected by the dichroic mirror 6 and is incident on the reflective polarization plate 7G via the lens 28. The green illumination light Ga is transmitted by the reflective polarization plate 7G and is incident on the image display device 10G.

The green illumination light Ga is subject to light modulation by the image display device 10G and is emitted as an s-polarized green image light Gb. The green image light Gb is reflected by the reflective polarization plate 7G and is incident on the color composition prism 8.

The blue illumination light Bd is reflected by the reflecting mirror 42 and is incident on the reflective polarization plate 7B via the lens 29. The blue illumination light Bd is transmitted by the reflective polarization plate 7B and is incident on the image display device 10B.

The blue illumination light Bd is subject to light modulation by the image display device 10B and is emitted as an s-polarized blue image light Be. The blue image light Be is reflected by the reflective polarization plate 7B and is incident on the color composition prism 8.

A composite of the red image light Rb, the green image light Gb, and the blue image light Be incident on the color composition prism 8 is produced by the color composition prism 8, projected from the projection lens 30 onto a screen, etc., and is displayed as a full color image.

In the color temperature changing mode, the filter 50 is inserted into the light path in order to achieve a low color temperature. As described below, the brightness of the displayed image is prevented from being lowered.

In the state in which the filter 50 is arranged on the light path, a portion of the blue illumination light Bb is reflected by the filter 50 as the blue illumination light Bc and the rest is emitted from the filter 50 as the blue illumination light Bd. The yellow illumination light Yb is produced as the reflected blue illumination light Bc irradiates the phosphor 2. Therefore, as shown in FIG. 5, the yellow illumination light Yc including the yellow illumination light Ya produced by the blue illumination light Ba emitted from the light source 1 and the yellow illumination light Yb produced by the blue illumination light Bc returning from the filter 50 are incident on the filter 50.

In essence, the amount of light of the blue illumination light Bd emitted from the filter 50 is decreased from about 2.2 to about 1.4 by causing a portion of the blue illumination light Bd to be reflected by the filter 50, and the mount of light of the yellow illumination light Yc is increased from 1 to about 1.2 by converting the blue illumination light Bc reflected by the filter 50 into the yellow illumination light Yb. In this way, lowering of the brightness occurring when the color temperature is lowered is inhibited by causing a portion of the blue illumination light Bb to be reflected by the filter 50 and increasing a portion of the yellow illumination light Yc in relation to the blue illumination light Bd.

In order to further inhibit lowering of the brightness, the filter 50 is tilted relative to the light axis as described below so that the spot of the blue reflected light on the phosphor surface is displaced from the irradiation spot of the blue laser light from the light source 1. The avoids saturation of the conversion efficiency of the phosphor due to overlapping of the spot of the blue reflected light over the irradiation spot of the blue laser light. Therefore, the efficiency of converting the blue reflected light into the yellow illumination light is improved and lowering of the brightness is further inhibited.

As described above, the efficiency of use of light is increased and lowering of the brightness of a displayed image is mitigated by causing a portion of the blue illumination light Bb to be reflected by the filter 50 toward the phosphor 2 with an appropriate reflectivity. Further, by tilting the filter 50 at an appropriate angle relative to the light axis, saturation of the conversion efficiency of the phosphor 2 is avoided and lowering of the brightness of the displayed image is further mitigated.

Brightness Priority Mode

Figure 6:
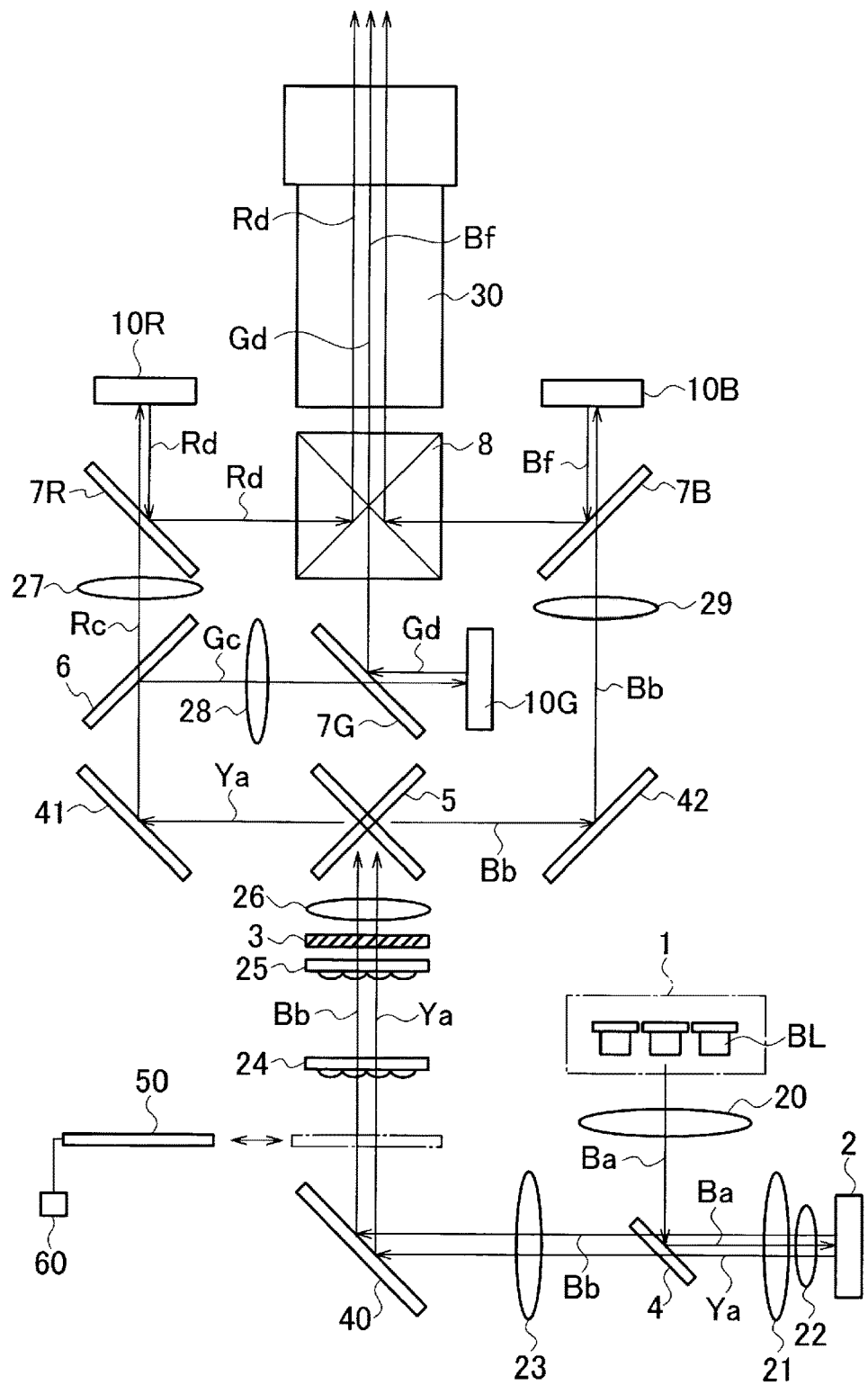
FIG. 6 schematically shows the brightness priority mode of the projection image display device according to the embodiment.

A description will be given of the brightness priority mode with reference to FIG. 6. FIG. 6 corresponds to FIG. 1. The brightness priority mode differs from the color temperature changing mode in that the filter 50 is retracted from the light path.

As shown in FIG. 6, the blue illumination light Ba emitted from the light source 1 is condensed by the condensing lens 20 and is reflected by the dichroic mirror 4. The blue illumination light Ba is further condensed by the condensing lenses 21, 22 and irradiates the phosphor 2.

The phosphor 2 converts the energy of the irradiating blue illumination light Ba and produces the yellow illumination light Ya in a wavelength band including a red band and a green band.

The yellow illumination light Ya produced by the phosphor 2 is transmitted by the condensing lenses 22, 21 and the dichroic mirror 4 and is incident on the collimator lens 23.

A portion of the blue illumination light Ba irradiating the phosphor 2 is not converted into the yellow illumination light Ya and is reflected by the phosphor 2 and is incident on the collimator lens 23 as the blue illumination light Bb. The blue illumination light Bb indicates the total amount of blue illumination light incident on the filter 50 and indicates the total amount of blue illumination light emitted from the filter 50.

The yellow illumination light Ya and the blue illumination light Bb incident on the collimator lens 23 are turned into parallel light and are reflected by the reflecting mirror 40 toward the first fly-eye lens 24. The yellow illumination light Ya and the blue illumination light Bb have the spectral distribution characteristic shown in FIG. 3.

The illumination distribution of the yellow illumination light Ya and the blue illumination light Bb is homogenized by the first fly-eye lens 24 and the second fly-eye lens 25. The yellow illumination light Ya and the blue illumination light Bb are turned into p-polarized light by the PCS 3 and are incident on the cross dichroic mirror 5 via the lens 26.

The yellow illumination light Ya and the blue illumination light Bb are subject to color separation by the cross dichroic mirror 5. The yellow illumination light Ya is reflected by the reflecting mirror 41 and is incident on the dichroic mirror 6. A red illumination light Rc and a green illumination light Gc included in the yellow illumination light Ya are subject to color separation by the dichroic mirror 6.

The red illumination light Rc is transmitted by the dichroic mirror 6 and is incident on the reflective polarization plate 7R via the lens 27. The red illumination light Rc is transmitted by the reflective polarization plate 7R and is incident on the image display device 10R.

The red illumination light Rc is subject to light modulation by the image display device 10R and is emitted as an s-polarized red image light Rd. The red image light Rb is reflected by the reflective polarization plate 7R and is incident on the color composition prism 8.

The green illumination light Gc is reflected by the dichroic mirror 6 and is incident on the reflective polarization plate 7G via the lens 28. The green illumination light Gc is transmitted by the reflective polarization plate 7G and is incident on the image display device 10G.

The green illumination light Gc is subject to light modulation by the image display device 10G and is emitted as an s-polarized green image light Gd. The green image light Gd is reflected by the reflective polarization plate 7G and is incident on the color composition prism 8.

The blue illumination light Bb is reflected by the reflecting mirror 42 and is incident on the reflective polarization plate 7B via the lens 29. The blue illumination light Bd is transmitted by the reflective polarization plate 7B and is incident on the image display device 10B.

The blue illumination light Bb is subject to light modulation by the image display device 10B and is emitted as an s-polarized blue image light Bf. The blue image light Bf is reflected by the reflective polarization plate 7B and is incident on the color composition prism 8.

A composite of the red image light Rd, the green image light Gd, and the blue image light Bf is produced by the color composition prism 8, projected from the projection lens 30 onto a screen, etc., and is displayed as a full color image.

Filter Reflectivity

The reflectivity of the filter 50 in the projection image display device 100 with respect to the blue illumination light Bb is set to be about 30% but this should not be construed as limiting the scope of the embodiment. It is desired that the reflectivity of the filter 50 be set to a proper value in accordance with the conversion efficiency of the phosphor 2, etc. in order to achieve a desired white balance (color temperature). For example, the conversion efficiency of the phosphor varies depending on the type of the phosphor, temperature of the phosphor, wavelength and power of the blue illumination light irradiating the phosphor 2, spot diameter on the surface of the phosphor 2, etc.

An exemplary method of setting the reflectivity of of the filter 50 in the projection image display device 10 with respect to the blue illumination light (Bb) is described below.

The power of the blue illumination light Ba emitted from the light source 1, and the power and spectral distribution of the blue illumination light Bb and the yellow illumination light Ya at the position where the filter 50 is placed are measured in the state in which the filter 50 is retracted from the light path or in an equivalent optical system. The conversion efficiency of the phosphor 2 is calculated accordingly.

The phosphor 2 is irradiated by the blue illumination light Ba at different power levels and the power of the yellow illumination light Ya produced by the phosphor 2 is measured. Correlation of the power of the yellow illumination light Ya to that of the blue illumination light Ba is calculated.

The power and spectral distribution are measured while the filter 50 is placed on the light path or in an equivalent optical system.

The color temperature is calculated from the result of measurement of the spectral distribution and the reflectivity for the blue illumination light required to achieve a target color temperature is calculated based on the result of calculation.

The power of the yellow illumination light Yb produced as a result of the blue illumination light Bc returning from the filter 50 irradiating the phosphor 2 varies between optical systems. It is therefore desired that measurements be made in a condition similar to the actual optical system as much as possible in order to increase the precision of setting the reflectivity.

The conversion efficiency of the phosphor 2 also varies depending on the power of the blue illumination light Ba emitted from the light source 1. For this reason, if the reflectivity is set at the maximum power, the reflectivity deviates from the target value at the minimum power. Thus, deviation of the reflectivity from the target value is minimized over the entire settable range, by setting the reflectivity at a medium power in the settable range.

If a recommended power is defined, the reflectivity may be set at the recommended power.

A detailed description will now be given of a structure for tilting the filter 50 relative to the light axis.

First, a description will be given of the relationship between a spot of the blue reflected light produced when the filter 50 reflecting a portion of the blue illumination light is at an angle to the light axis, an image on the phosphor surface of the spot of the blue laser light from the light source 1, and an image (conjugate image) of a spot formed in each cell of the second fly-eye lens 25.

Figure 7:
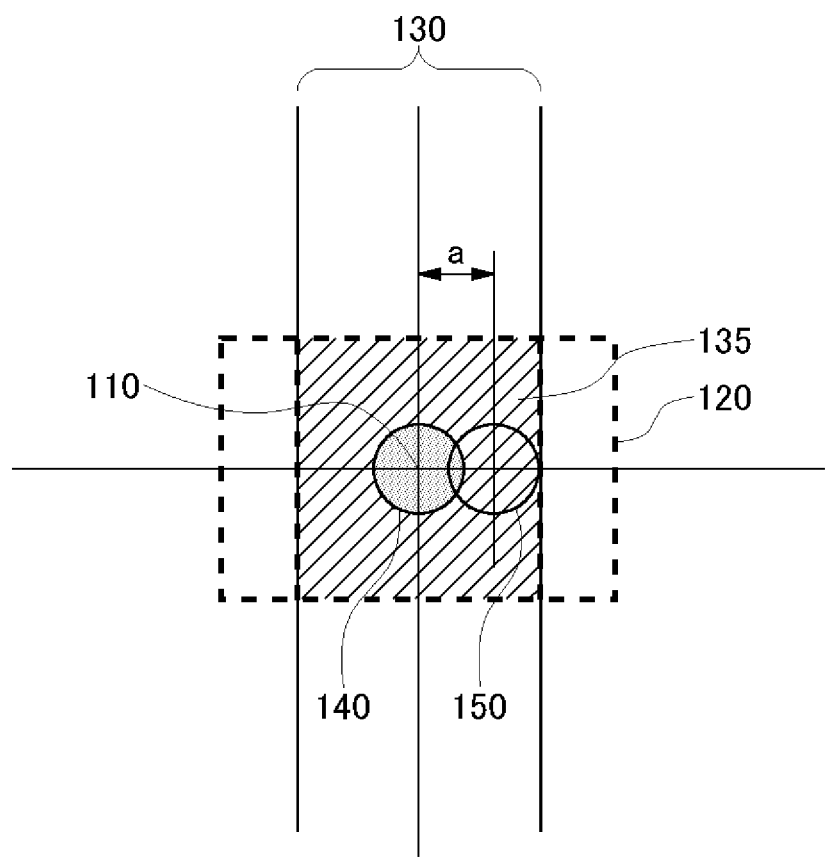
FIG. 7 shows relative positions, on the phosphor surface of the projection image display device according to the embodiment, of the irradiation spot and the conjugate images of the cell of the second fly-eye lens and of the slit width of the polarization conversion system.

FIG. 7 shows relative positions, on the phosphor surface, of the irradiation spot and the conjugate images of the cell of the second fly-eye lens 25 and of the slit width of the PCS 3.

An irradiation spot 140 of the blue laser light from the light source 1 is formed on the phosphor surface around a light axis 110. If the filter 50 is tilted relative to the light axis, an irradiation spot 150 of the blue illumination light from the filter 50 is formed at a position displaced from the irradiation spot 140 of the blue laser light from the light source 1.

Figure 8:
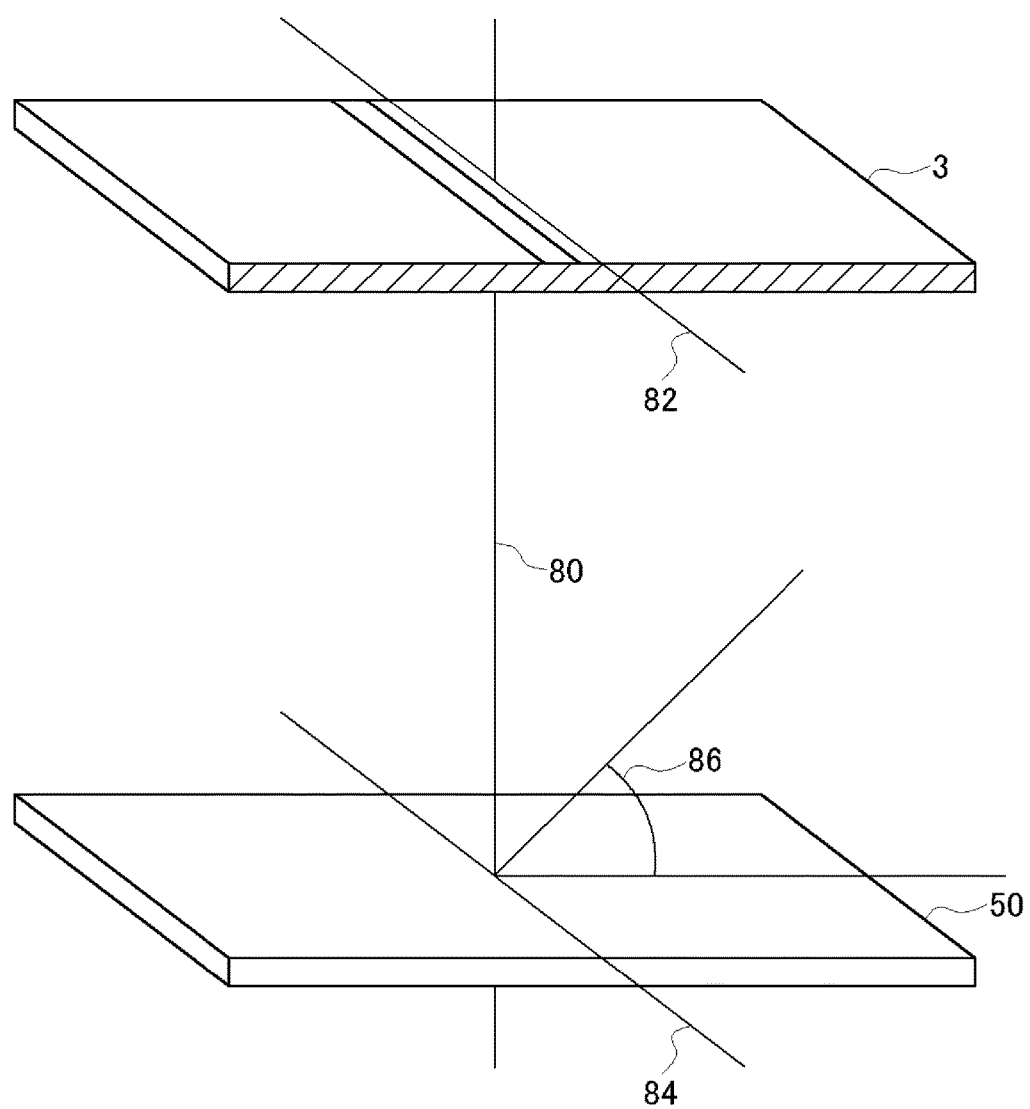
FIG. 8 shows a direction in which the filter of the projection image display device according to the embodiment is tilted.

FIG. 8 shows a direction in which the filter 50 is tilted. An axis 84 around which the filter 50 according to the embodiment is tilted is parallel to a direction 82 in which a slit in the PCS 3 extends. A reference symbol 86 indicates an angle of tilt. In other words, the irradiation spot 150 of the blue reflected light is formed at a position displaced from the position of the irradiation spot of the blue laser light from the light source 1 in the longitudinal direction of the rectangular cell. Further, the axis 84 around which the filter 50 is tilted may intersect a light axis 80 of the filter 50.

Since the phosphor surface and the second fly-eye lens surface are conjugate with each other, with the first fly-eye lens being an optical pupil, a conjugate image of the boundary of one cell of the second fly-eye lens 25 is formed on the phosphor surface when viewed from the side of the second fly-eye lens 25, as indicated by a reference symbol 120. A region on the phosphor surface corresponding to one cell of the second fly-eye lens 25 will be referred to as "first corresponding region." As indicated by a reference symbol 130, a conjugate image of the slit of the PCS 3 behind the second fly-eye lens 25 is formed on the phosphor surface. A region corresponding to the width of the slit of the PCS 3 will be referred to as "a second corresponding region." A region in which the first corresponding region and the second corresponding region overlap will be referred to as "a third corresponding region" and indicated by a reference symbol 135.

If the entirety of the irradiation spot 150 of the blue reflected light on the phosphor surface is accommodated in the first corresponding region 120, images of the yellow excitation light from the entirety of the irradiation spot 150 and the blue re-reflected light are formed inside the boundary of one cell of the second fly-eye lens 25. If the entirety of the irradiation spot 150 of the blue reflected light on the phosphor surface is accommodated in the third corresponding region 135, images of the yellow excitation light from the entirety of the irradiation spot 150 and the blue re-reflected light are formed within the range defined by the slit width of the PCS 3 behind one cell of the second fly-eye lens 25. It will therefore be known that, with reference to FIG. 7, the irradiation spot 150 is required to be accommodated in the width of the cell of the second fly-eye lens 25 in the longitudinal direction and in the third corresponding region 135 indicated by diagonal lines and defined by the slit width of the PCS 3 in the transversal direction.

Thus, by tilting the filter 50 relative to the light axis and preventing the irradiation spot 140 of the blue laser light from the light source 1 from overlapping the irradiation spot 150 of the blue reflected light, local concentration of the energy on the phosphor 2 is avoided and the yellow illumination light is excited by the light reflected from the filter 50 while the conversion efficiency of the phosphor 2 is being high. This inhibits reduction in the brightness from occurring when the color temperature is lowered.

The angle at which the filter 50 is tilted relative to the light axis is regulated to meet conditions 1-4 described below. The conditions will be described one by one.

Condition 1: the angle of tilt of the filter 50 is within a range of angles of incidence on the collimator lens. If the blue reflected light is incident in a range defined by the exit of the group of collimator lenses, the blue reflected light travels backward through the group of collimator lenses 23 and is condensed on the phosphor surface. This is a minimum condition that should be met.

Condition 2: the irradiation spot 140 of the blue laser light from the light source 1 does not completely overlap the irradiation spot 150 of the blue reflected light on the phosphor surface.

The blue reflected light is condensed at a position displaced from the irradiation spot of the laser light from the light source 1 due to the inclination of the filter 50 so that local concentration of the energy on the phosphor 2 is avoided and the wavelength conversion efficiency is increased. As described above, incidence of locally high energy results in saturation of the wavelength conversion efficiency. Therefore, reduction in the conversion efficiency inhibited by preventing the spots from overlapping.

The blue reflected light incident on the phosphor surface is diffused as the yellow illumination light Yb and condensed by the group of collimator lenses 23 so that an image thereof is formed on one cell of the second fly-eye lens 25. If the filter 50 is not tilted, the blue light reflected by the filter 50 (blue reflected light) travels backward on the light path and returns to a location of excitation on the phosphor surface, i.e., a position irradiated by the blue laser from the light source 1. Therefore, the wavelength conversion efficiency will be lower than when the filter 50 is tilted.

Condition 3: a conjugate image 152 of the irradiation spot of the blue reflected light is formed in the same cell that a conjugate image 142 of the irradiation spot of the blue laser light is formed. In other words, the conjugate image 152 of the irradiation spot of the blue reflected light is accommodated in the range of the third corresponding region 135. The spot diameter is not considered here so that the condition requires that the center of the spot is accommodated in the range of the third corresponding region 135.

A description will be given of a condition in which an image of the yellow illumination light excited by the irradiation spot 150 of the blue reflected light is formed in a range of one cell of the second fly-eye lens 25 when the filter 50 reflecting a portion of the blue illumination light is tilted.

FIGS. 9A and 9B show relative positions of the spot image produced on the phosphor surface by the blue reflected light from the tilted filter 50 and the spot conjugate image on the second fly-eye lens surface. A reference symbol 3S denotes a PCS surface, a reference symbol 24 denotes a first fly-eye lens surface, a reference symbol 25S denotes a second fly-eye lens surface, and a reference symbol 2S denotes a phosphor surface. For brevity, the figure only shows how images are formed in the central cell of the first fly-eye lens 24. Images are formed similarly in other plurality of cells of the first fly-eye lens 24.

Parameters are defined as described below.

f1: focal distance of the collimator lens 23
f2: focal distance of the first fly-eye lens 24
a: distance on the phosphor surface from the light axis to the center of the irradiation spot of the blue reflected light
b: distance on the second fly-eye lens surface 25S from the light axis of the cell to the center of the spot of the yellow illumination light excited by the irradiation spot of the blue reflected light
c: width of the cell of the second fly-eye lens 25 (cell diameter)
d: slit width of the PCS 3

FIG. 9A shows an irradiation spot produced on the phosphor surface 2S by the blue reflected light from the filter 50 tilted relative to the light axis. The irradiation spot 140 of the blue laser light from the light source 1 and the irradiation spot 150 from the blue reflected light from the tilted filter 50 are imaged on the phosphor surface 2S, displaced from each other by a distance a. The spot conjugate image 142 of the blue laser light from the light source 1 is formed on the light axis of the second fly-eye lens surface 25S.

FIG. 9B shows a spot conjugate image of the yellow illumination light excited by the irradiation spot 150 of the blue reflected light. The spot conjugate image 152 of the irradiation spot 150 of the blue reflected light is formed on the second fly-eye lens surface 25S, displaced from the spot conjugate image 142 formed on the light axis by the blue laser light from the light source 1 by a distance b.

The distance b between the center of the spot conjugate image 142 on the second fly-eye lens surface 25S, i.e., the light axis of the cell, to the center of the spot conjugate image 152 is calculated according to the following expression.

$$b=a*(f2/f1)$$

A description will be given of a range of incidence of light on the cell of the second fly-eye lens 25. First of all, the cell of the second fly-eye lens 25 in which the conjugate image of the irradiation spot 150 of the blue reflected light on the phosphor surface is formed should be identical to the cell in which the conjugate image of the irradiation spot 140 of the blue laser light from the light source 1 is formed. If the distance b from the light axis of the cell to the center of the spot of the yellow illumination light excited by the blue reflected light is smaller than ½ of the width c of the cell of the second fly-eye lens 25, the yellow light excited from the entirety of the irradiation spot 150 of the blue reflected light and the blue re-reflected light re-reflected from the phosphor 2 are imaged inside the boundary of one cell of the second fly-eye lens 25. The condition is represented by the expression below.

$$[c*½]>b$$

A description will be given of a condition to form the conjugate image of the irradiation spot of the blue reflected light in the range defined by the slit width of the PCS 3.

A description will be first given of the structure and function of the PCS 3 with reference to FIG. 10A. The PCS 3 is a plate-shaped optical device for aligning a randomly polarized light into a linearly polarized light and includes a plurality of polarizing beam splitters (PBS) 3a that are quadratic prisms having a parallelogram bottom surface with an acute angle of 45°, and a half-wave plate 3b. The polarizing beam splitters are stacked closely in a direction perpendicular to the columnar direction of the quadratic prism (direction of arranging the PBSs) such that the identically-sized sloped sides of parallelograms are aligned, thereby forming a plate structure.

In this embodiment, the width formed by a plurality of adjacent PBSs 3a that occur on the surface of the plate-shaped PCS 3 corresponds to the slit width 130 of the PCS 3 in FIG. 7 and is denoted by d. The width of the half-wave plate 3b is also d.

By causing light to be incident on every other PBS 3a forming the PCS 3, the plurality of PBSs 3a on the emission side emit light polarized in alternately different directions of polarization, from one PBS 3a to another. The light polarized in alternately different directions of polarization and emitted from the PBSs 3a is turned into uniformly polarized light by the half-wave plates 3b arranged on the surface of every other of the plurality of PBSs 3a that occur on the emission side of the plate-shaped PCS 3 such that the light emitted from all PBSs 3a is uniformly polarized.

Referring to FIG. 10a, when a randomly polarized light is incident on the PBS 3a from the right side of the figure, the p-polarized component of the incident light is transmitted once through the interface between two PBSs 3a and emitted from the PCS 3. The s-polarized component of the incident light is reflected by the interface. The s-polarized light reflected once is reflected for a second time at the interface with the adjacent PBS 3a and is emitted from the PBS 3a adjacent to the PBS 3a from which the p-polarized light is emitted.

The half-wave plate 3b is arranged on the emission side of the PCS 3 and on the surface on the emission-side surface of the PBS 3a adjacent to the PBS 3a on which the light is incident. This allows the p-polarized light transmitted through the PBS 3a is transmitted through the half-wave plate 3b and the p-polarized is turned into the s-polarized light before being emitted from the surface of emission of the PCS 3. To describe it alternatively, linear polarization for emission is controlled depending on whether the half-wave plate is arranged on the PBS 3a receiving the light or the PBS 3a not receiving light.

As shown in FIG. 10B, the length of the side of the parallelogram of the PBS 3a that occurs on the surface of the PCS 3 in the direction of arrangement of the PBSs 3a is half the width d of the longer side of the rectangular cell of the second fly-eye lens 25. The middle point of the side of the parallelogram of each PBS 3a that occurs on the surface of the PCS 3 is arranged to be aligned with the center or the end of the cell of the second fly-eye lens 25. The arrangement allows the blue light and the yellow light emitted from the light source 1 and reflected from the phosphor 2 to be transmitted through the center of the cells of the second fly-eye lens 25 and to be incident on the middle point of one side of the parallelogram of the PBS 3a. The relative positions ensure that the light is incident only on the PBS 3a aligned with the center of each cell of the second fly-eye lens 25 so that only the s-polarized light is output from the PCS 3.

For efficient polarization conversion, the displacement of the spot of the blue reflected light due to the inclination of the filter 50 should occur within the range defined by the width of the PBS 3a in the direction of arrangement of the PBSs 3a and within the range defined by the width of the cell of the second fly-eye lens 25 in the columnar direction of the PBS 3a. If the displacement is beyond the range defined by the width of the PBS 3a, the light is prevented from being incident on the cell of the second fly-eye lens corresponding to the cell of the first fly-eye lens 24 with the result that the brightness is reduced. If the displacement is beyond the range defined by the width of the cell of the second fly-eye lens 25, a differently polarized light occurs in the light emitted from the PCS 3 with the result that the brightness is reduced. The regions defined by these ranges are illustrated in FIG. 7 with reference to conjugate images on the phosphor surface.

In this embodiment, the half-wave plate is arranged on one side of the parallelogram corresponding to the light path of the p-polarized light in the PBS 3a in order to emit an s-polarized light. Depending on the optical system behind the PCS 3, the half-wave plate may be arranged on the light path of the s-polarized light in the PBS 3a as shown in FIG. 10C so as to emit a p-polarized light.

As described above, if the amount of displacement b of the spot conjugate image of the blue reflected light is smaller than ½ of the width of the PBS 3a forming the PCS 3, images of the yellow light excited from the entirety of the irradiation spot 150 of the blue reflected light and the blue re-reflected light re-reflected from the phosphor 2 are formed within the range defined by the slit width of the PCS 3 behind one cell of the second fly-eye lens 25. The condition is represented by the expression below.

$$[d*\tfrac{1}{2}] > b$$

By accommodating the conjugate image of the irradiation spot of the blue reflected light within the width of the PCS 3, polarization conversion of the blue and yellow illumination light originating from the blue reflected light occurs in the same manner as polarization conversion of the blue and yellow illumination light originating from the blue laser from the light source 1, with the result that the brightness is maintained in a lossless manner.

As described above, the angle of tilt of the filter 50 is defined by the diameter of one cell of the second fly-eye lens 25 and the slit width of the PCS 3. Angle values depend on the design of the illumination optics. Large focal distances and a large distance from the phosphor surface to the second fly-eye lens 25 result in a smaller angle.

The range in which the position of the irradiation spot of the blue reflected light should be accommodated is defined as discussed above. By irradiating the phosphor in the range prescribed above, the efficiency of illumination is increased, while also maintaining the conversion efficiency of the phosphor 2 at the maximum level.

Condition 4: the conjugate image 152 of the irradiation spot of the blue reflected light is accommodated in the range of the central cell of the second fly-eye lens 25.

A description will now be given of a proper range of the spot image (conjugate image) formed on the cells of the second fly-eye lens 25, i.e., a condition in which the conjugate image of the irradiation spot of the blue reflected light is accommodated within the range defined by the width of all of the plurality of cells included in the second fly-eye lens 25.

An image on the phosphor surface as seen from a point on the light axis is formed on the central cell of the second fly-eye lens 25 located on the light axis. Meanwhile, an image on the phosphor surface is formed at an angle on a cell of the second fly-eye lens 25 positioned at a distance from the light axis. Therefore, the image is reduced in a direction defined by the angle.

The relationship shows that, if the position of the spot on the phosphor surface irradiated by the light returning from the filter 50 is displaced from the position of the spot on the phosphor surface irradiated by the blue laser light, apparent displacement in the central cell of the second fly-eye lens 25 is largest. Therefore, if the conjugate image of the irradiation spot of the blue reflected light on the phosphor surface is accommodated in the range of the central cell of the second fly-eye lens 25, the spot will equally be accommodated in the cell range of all other cells.

The illumination light from the light source 1 is not completely uniform so that the neighborhood of the light axis is brightened. It is desirable from the perspective of efficient use of the light source that those of the plurality of cells of the second fly-eye lens 25 at the center of the light axis where the illumination light from the light source 1 is bright meet the above condition.

The blue reflected light is diagonally incident on the phosphor surface. However, the yellow excitation light and the blue re-reflected light are symmetrically radiated and diffused around the direction perpendicular to the phosphor surface so that the pseudo light source at the irradiation spot of the original blue laser light and the pseudo light source at the irradiation spot of the blue reflected light produce parallel light.

FIG. 11 shows a comparison between the reflectivity of the filter 50 and the brightness of images. The black-body radiation curve can be approximated by a straight line passing through the blue point and the middle point of the green-to-red line in the color temperature range of about 9500 K-5500 K. It is therefore possible to move the energy substantially along line of black body radiation by increasing or decreasing the blue light, and the color temperature is changed accordingly. If the color temperature is outside the range of about 9500 K-5500 K, the light can only be controlled to increase bluishness.

It will be assumed that the brightness of an output image in the absence of a filter at a color temperature of 7500 K is 100%. By varying the color temperature to 6500 K by a method of decreasing the gain of a blue image signal in the absence of the filter 50, the brightness of the output signal is lowered to 95%.

Meanwhile, if the filter 50 is placed as in this embodiment and if the transmittance of the filter 50 for the blue light is 80% (reflectivity is 20%) and the angle of tilt is 0°, the color temperature is lowered to 6500 K but the brightness of the output image is maintained at 100%. In case that the filter 50 is arranged without tilting it relative to the light axis, the color temperature can be lowered, maintaining the original brightness and without lowering the gain of the blue image signal, by reflecting 20% of the blue light toward the phosphor surface.

If the transmittance of the filter 50 for the blue light is 90% (reflectivity is 10%) and the angle of tilt is 1°, the color temperature is lowered to 6500 K but the brightness is increased to 105% because the irradiation spot of the blue laser light and the irradiation spot of the blue reflected light do not overlap. In case that the filter 50 is arranged at an angle to the light axis, the color temperature can be lowered, maintaining the original brightness and without lowering the gain of the blue image signal, by reflecting 10% of the blue light toward the phosphor surface. The reflectivity is lower than in the case of absence of tilt because the spots do not overlap on the phosphor surface in the presence of tilt and the wavelength conversion efficiency of the phosphor is increased accordingly.

Reduction in the output of the light source 1 when the transmittance of the filter 50 for the blue light is 90% (reflectivity is 10%) and the angle of tilt is 1° results in the same brightness as produced when the color temperature is 7500 K and the filer is not provided. In this way, the color temperature is changed at the same brightness. Moreover, energy-saving operation of the projection image display device 100 is enabled.

Thus, by providing the filter 50, the reflectivity for the blue illumination light is lowered, and a portion of the blue illumination light is reflected to return it to the phosphor 2 and excite the yellow illumination light. Thereby, the brightness of the output image is maintained. Further, by providing the filter 50 at an angle to avoid overlapping of the irradiation spot of the blue laser light and the irradiation spot of the blue reflected light, the wavelength conversion efficiency of the phosphor 2 is increased and the brightness of the output image is further increased.

In the projection image display device according to the embodiment, a plurality of filters 50 that differ in reflectivity in the blue band may be made available so as to make different color temperatures available. By making a plurality of filters 50 available, the system can switch to a plurality of color temperatures without lowering the brightness.

As regards the color temperature range subject to control, it is sufficient that the color temperature of images is controlled in a range of about 7500 K-5500 K in the case of most projection image display devices. By controlling the color temperature to be about 7500 K in the absence of a filter, the color temperature is changed to 6500 K or 5500 K by inserting the filter 50 to convert blue into yellow and lowering the color temperature and increasing the brightness accordingly.

A description will be given of the relationship between the efficiency of illumination by blue light and the wavelength conversion efficiency of the phosphor 2 with reference to FIGS. 12A and 12B.

Figure 12B:
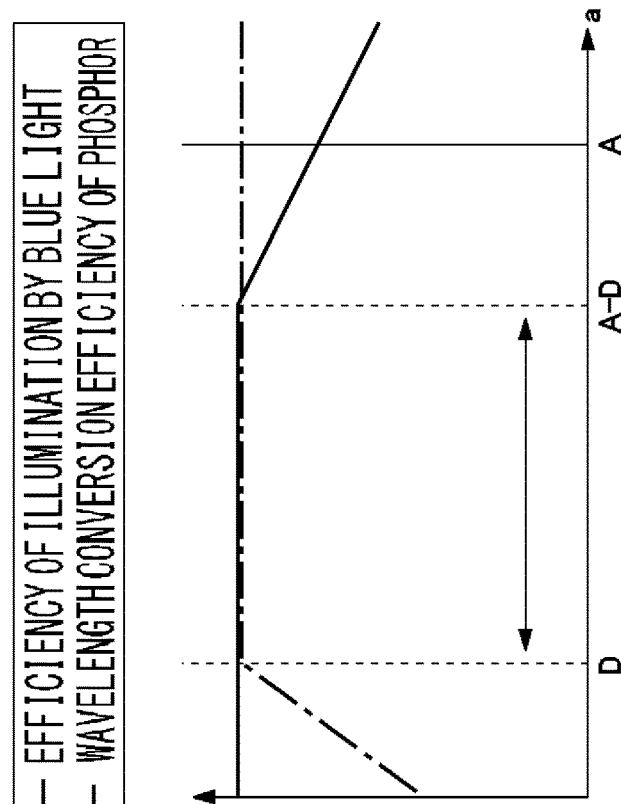
FIG. 12A shows relative positions of the irradiation spot of the blue laser light from the light source on the phosphor surface of the projection image display device according to the embodiment and of the irradiation spot of the blue reflected light from the filter, and FIG. 12B schematically shows a change in the efficiency of illumination by the blue light and the wavelength conversion efficiency of the phosphor in relation to the amount of displacement between the two irradiation spots.
Figure 12A:
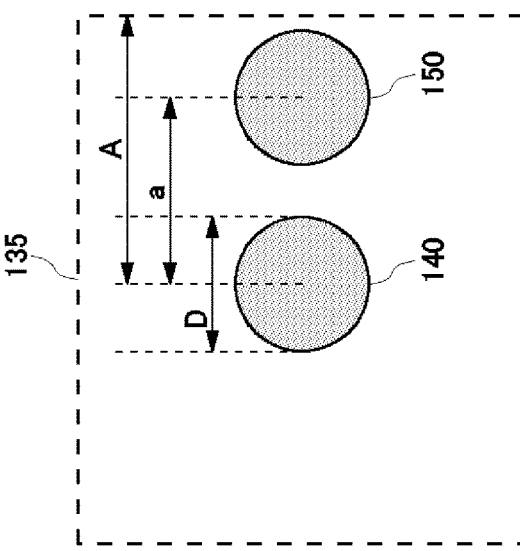

FIG. 12A shows relative positions of the irradiation spot 140 of the blue laser light from the light source 1 and the irradiation spot 150 of the blue reflected light from the filter 50 in the third corresponding region 135 determined by the conjugate images on the phosphor surface of the width c of the cell of the second fly-eye lens 25 and the width d of the cell of one PBS 3a of the PCS 3.

The diameter of the two irradiation spots 140 and 150 will be denoted by D, and ½ of the width between the boundaries of the third corresponding region 135 on the phosphor will be denoted by A.

When the two irradiation spots 140 and 150 are displaced by tilting the filter 50 (when the distance a is increased), the spots of the reflected light leaves the effective region of the PCS 3 if a>A−D/. As a result, the efficiency of illumination is lowered. If a<D, the two irradiation spots 140 and 150 overlap so that the light density is increased and the wavelength conversion efficiency of the phosphor 2 is lowered. Therefore, the range D<a<A−D is optimal.

FIG. 12B schematically shows a change in the efficiency of illumination by the blue light and the wavelength conversion efficiency of the phosphor 2 in relation to the amount of displacement L between the two irradiation spots 140 and 150. If the distance a exceeds D, the wavelength conversion efficiency of the phosphor 2 is maximized. If the distance a exceeds A−D, however, the two irradiation spots 140 and 150 overlap so that the efficiency of illumination by the blue light begins to be lowered.

In this embodiment, the width of the third corresponding region 135 in direction of inclination of the filter 50 is equal to the width of the conjugate image of the slit width d of the PCS 3 on the phosphor surface so that A={d/(f2/f1)}/2. Therefore, the range D<a<d/{2*(f2/f1)}−D is optimum.

The filter 50 described in this embodiment is configured such that the axis around which the filter 50 is tilted is parallel to the direction of the slit of the PCS 3. Alternatively, the filter 50 may be tilted at any arbitrary direction so long as the irradiation spot 150 of the blue reflected light on the phosphor surface is accommodated in the range of the third corresponding region 135.

Described above is an explanation based on an exemplary embodiment. The embodiment is intended to be illustrative only and it will be obvious to those skilled in the art that various modifications to constituting elements and processes could be developed and that such modifications are also within the scope of the present invention.

What is claimed is:

1. A projection image display device comprising:
    a light source that emits a blue illumination light;
    a phosphor that produces, in a region irradiated by the blue illumination light, a yellow illumination light including a component in a red band and a component in a green band from a portion of the blue illumination light and that reflects the blue illumination light and the yellow illumination light; and
    a filter arranged on a light path in such a manner that the filter can be inserted into or retracted from the light path,
    wherein when the filter is inserted into the light path,
        the filter reflects a portion of the blue illumination light reflected by the phosphor toward the phosphor,
        the filter reflects the portion of the blue illumination light so as to be imaged at a position displaced from a region on a phosphor surface irradiated by the blue illumination light, and
        the phosphor produces a yellow illumination light also from the blue illumination light reflected by the filter,
    wherein when the filter is retracted from the light path, by a filter driver, the blue illumination light and the yellow illumination light reflected by the phosphor are not reflected by the filter and are not transmitted by the filter.

2. The projection image display device according to claim 1, wherein
    the filter is placed on a light path of the blue illumination light and the yellow illumination light turned into parallel light.

3. The projection image display device according to claim 1, wherein
    the filter is tilted relative to a light axis.

4. The projection image display device according to claim 1, further comprising:
    an integrator including a first fly-eye lens and a second fly-eye lens, wherein
    the first fly-eye lens places a surface of the second fly-eye lens and the phosphor surface so as to be optically conjugate with one another.

5. The projection image display device according to claim 4, wherein
    an image produced at a displaced position is accommodated in a width of one cell of the second fly-eye lens.

6. The projection image display device according to claim 5, further comprising:
    a polarization conversion system at a light emission side of the second fly-eye lens, wherein the image produced at the displaced position is accommodated in a width of a slit of the polarization conversion system corresponding to a cell of the second fly-eye lens.

* * * * *